United States Patent

Chaffee

Patent Number: 4,774,713
Date of Patent: Sep. 27, 1988

[54] SEGMENTED LASER TUBE STRUCTURE

[75] Inventor: Edwin G. Chaffee, Salt Lake City, Utah

[73] Assignee: American Laser Corporation, Salt Lake City, Utah

[21] Appl. No.: 942,345

[22] Filed: Dec. 16, 1986

[51] Int. Cl.⁴ .............................................. H01S 3/03
[52] U.S. Cl. .......................................... 372/62; 372/65
[58] Field of Search ................... 372/61, 62, 63, 65, 372/55, 34

[56] References Cited

U.S. PATENT DOCUMENTS

| | | | |
|---|---|---|---|
| 3,437,950 | 4/1969 | Okaya et al. | 372/61 |
| 3,501,714 | 3/1970 | Myers et al. | 331/94.5 |
| 3,531,734 | 9/1970 | Gordon et al. | 372/62 |
| 3,670,262 | 6/1972 | Hallock et al. | 331/94.5 |
| 3,753,144 | 8/1973 | Kearns et al. | 372/62 |
| 4,001,720 | 1/1977 | Carbonetta, Jr. | 372/62 |
| 4,376,328 | 3/1983 | Mefferd | 445/28 |
| 4,378,600 | 3/1983 | Hobart | 372/62 |
| 4,553,241 | 11/1985 | Chaffee | 372/62 |
| 4,685,109 | 8/1987 | Carlson et al. | 372/62 |
| 4,719,638 | 1/1988 | Carlson et al. | 372/62 |

FOREIGN PATENT DOCUMENTS

| | | | |
|---|---|---|---|
| 0196211 | 10/1986 | European Pat. Off. | 372/36 |
| 0003491 | 1/1979 | Japan | 372/61 |
| 2161319 | 1/1986 | United Kingdom | 372/61 |

*Primary Examiner*—William L. Sikes
*Assistant Examiner*—B. Randolph
*Attorney, Agent, or Firm*—B. B. Olive

[57] ABSTRACT

A plurality of thin wall ceramic-metal segments are brazed together to form a gas laser tube assembly. Within each segment there is mounted a ferrule with a central hole. The series of holes formed in the ferrules define the discharge bore and gas return paths are formed in the wall of structure supporting the ferrules.

7 Claims, 1 Drawing Sheet

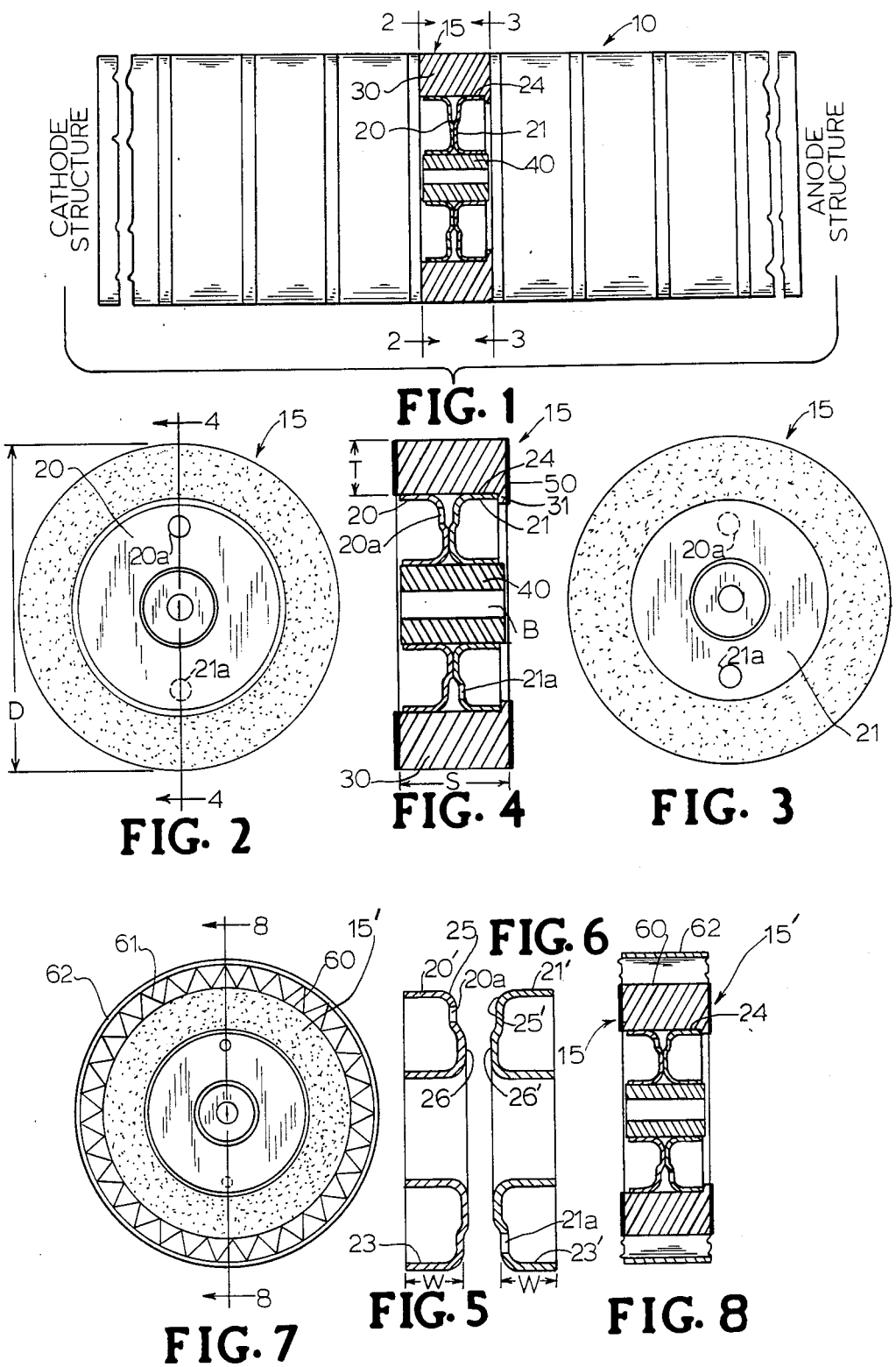

SEGMENTED LASER TUBE STRUCTURE

TECHNICAL FIELD

The invention relates to lasers and more particularly to a laser tube made up of a plurality of ceramic-metal segments brazed together to form a composite tube.

BACKGROUND ART

It has been known to construct laser tubes as a continuous thick wall tube having a central discharge bore and gas return bores spaced radially outward from the discharge bore. A laser tube has also been constructed from relatively thick wall segments with mating faces and aligned bores providing discharge and gas return bores. U.S. Pat. Nos. 3,501,714 and 3,670,262 illustrate two forms of the segment-type construction.

It has also been known to provide a continuous tube with a series of refractory metal, relatively thin discs centrally mounted on longitudinally-spaced annular metal supports. The main discharge bore is defined by holes in the center of the refractory metal discs and the gas return paths are defined by holes in the annular metal supports. U.S. Pat. No. 4,376,328 illustrates the described refractory metal disc construction and also illustrates coaxially aligned cylindrical shields on the annular metal supports to control gas pumping within the tube.

In U.S. Pat. No. 4,553,241 applicant disclosed a still further improved segment-type laser tube construction formed by metallic cup members mounting relatively thin discs made of refractory metal with each cup member being supported within a relatively thin cylindrical segment formed of electrically insulating material. Structure adapted to either liquid or air cooling is illustrated. U.S. Pat. No. 4,553,241 sets forth several advantages achieved by the improved segmented laser tube construction described in the patent and among which was the advantage of having an economical manufacturing cost. With continued experience and increasing price competition, it has become evident that even further improvements are needed. In particular, there is a need to further reduce the cost of manufacturing a segmented-type laser tube, a need to increase the efficiency of the segmented-type tube so as to have the advantage of the efficiency of the normally more efficient solid bore tube, a need to provide a segmented-type construction which is easy to start and a need to provide a gas return system which resists bypass discharge and with acceptable dissipation of heat from the discharge bore to the surrounding cooling medium, whether water or air.

Taking all the known prior art into account, it has not heretofore been known in a segment-type laser tube to form the laser discharge in a series of axially-aligned ferrules, one per segment, of a length substantially equal to the width of the segment and support the ferrules with heat conductive structure mounted within the individual segment in which the ferrule is mounted and form a tortuous gas return path in such supporting structure. The result of such arrangement is to achieve substantially the efficiency of a solid bore tube.

With the foregoing background and practical considerations in mind, the present invention is directed to providing a further significantly improved, segmented, ceramic-metal laser tube construction. While primarily intended for use is water-jacketed argon-ion lasers, the improved tube construction in also anticipated to find application in those types of laser tubes having fin-type air cooling. The achieving of these improvements and other objects will thus become apparent as the description proceeds.

DISCLOSURE OF INVENTION

An improved laser tube particularly adapted for use in argon-ion lasers is provided. The improved tube construction in a preferred embodiment as described and illustrated is made of segments which are brazed together. Each segment comprises a relatively thin wall ceramic cylinder within which is mounted a pair of relatively thin, stamped cup members, the rims of which face in opposite directions and are brazed to the ceramic. The cup members may be joined as illustrated or may be separated by a selected number of thin metallic spacer discs, the selected number of which determines the amount of space between the cup members. A cylindrical-shaped ferrule passes through central apertures formed in the cup members and through the spacer discs, if any, and is brazed to the cups in a secured position. The ferrule provides a bore through which the laser discharge passes and the length of the ferrule is equal to or slightly less than the width of the segments. The segments after being formed as subassemblies are then joined together by brazing mating surfaces to hermetically seal the discharge. An active brazing alloy (ABA alloy) is employed. Such alloy contains titanium as one of its constituents and allows the alloy to wet ceramic directly without prior metallization. Each cup member has an opening providing a gas return path which passes through the space between the pair of cup members and exists through a gas return opening in the opposite cup member which is purposely misaligned with the other gas return path opening. Thus, the gas return path is established as a zig-zag or tortuous-type path between the pair of cup members to inhibit any tendency for a discharge to be established in the gas return path as distinct from the main discharge bore. A suitable electrically insulating glaze is applied over the tube assembly to eliminate electrolysis. The brazing between individual segments also seals the vacuum-water interface when a water-jacketed-type tube is being employed or the vacuum-air interface when an air-fin cooled-type tube is being employed.

Although the preferred embodiment of the invention is a water-jacketed tube, cooling fins may be brazed to the segment subassemblies using an ABA process. The fins are interrupted at selected intervals to avoid longitudinal expansion problems with the housing material surrounding the fins.

BRIEF DESCRIPTION OF THE DRAWINGS

FIG. 1 is a longitudinal, fragmentary, side elevation view illustrating a laser tube structure according to the invention with the brazing thickness exaggerated for illustration and without anode or cathode structure.

FIG. 2 is an end view of one of the ceramic-metal subassemblies employed in the invention taken in the direction of line 2—2 of FIG. 1.

FIG. 3 is an end view of one of the ceramic-metal subassemblies employed in the invention taken in the direction of line 3—3 of FIG. 1.

FIG. 4 is a section view taken substantially along line 4—4 of FIG. 2 in which brazing thickness is exaggerated for illustration.

FIG. 5 is an enlarged section view of the left cup member seen in FIG. 4.

FIG. 6 is an enlarged section view of the right cup member seen in FIG. 4.

FIG. 7 is a reduced end view of the FIG. 2 segment illustrating cooling fins incorporated with the individual segment subassemblies.

FIG. 8 is a reduced section view taken substantially along line 8—8 of FIG. 7.

BEST MODE FOR CARRYING OUT THE INVENTION

A water jacketed and water cooled argon ion laser tube 10 is used by way of example in a first embodiment in reference to FIGS. 1-4. FIG. 7 is later referred to and used to illustrate a second air cooled embodiment. The usual cathode and anode assemblies at the end of the tube have been eliminated in FIG. 1 as well as vacuum, cooling and power equipment and other housing structure surrounding the tube to simplify the description.

Tube 10 is made up of a plurality of individual, cylindrical segment subassemblies 15, the number and size of which will vary with the type laser to which the invention construction is applied. For example there may be as few as five segment subassemblies 15 or as many as one hundred. Each subassembly 15 comprises a pair of thin, round metallic cup members 20,21 a thin wall ceramic segment 30 having a boss or step portion 31 and a cylindrical refractory ferrule 40. The cup members 20, 21 are preferably formed of a metal with excellent heat conductive properties such as copper of a thickness of about 0.5 millimeters. Segment 30 is formed of an electrically insulative ceramic such as alumina or beryllia and ferrule 40 is formed of a sputter resistant material such as tungsten, beryllia or silicon carbide.

The rim portions 20', 21' of the respective cup members 20, 21 are interfaced to the ceramic segment 30 by a suitable alloy braze 24 to ensure good thermal transfer. An ABA alloy, as previously defined, is preferred for this application. The thickness of braze 24 is in practice, of course, an extremely thin film (e.g. 0.001 to 0.002"). The rim width W is selected to ensure sufficient braze area and minimum thermal impedance across the braze joint. Each rim is contoured as indicated at 25, 25' into the central portion as indicated at 26, 26' with an appropriate radius to further weaken the cup member mechanically and thereby, in conjunction with the cup members relatively thin wall, minimize opportunity for either ceramic or metal fracture. Cup members 20, 21 are joined together by an ABA alloy as illustrated in FIGS. 1, 4 and 8. It is recognized that excessive thermal impedance is introduced if either of the cup members 20,21 are too thin and if too thick introduce the possibility of the respecitve cup member 20, or 21 having enough mechanical strength to break the braze 24. Thus, it has been found that if the cup members 20,21 are made of copper of about 0.5 millimeter thickness and constructed as described an essentially ideal operating condition and design compromise between necessary strength as well as weakness is achieved.

The series of axially aligned ferrules 40, brazed to and within the central apertures of the cup members 20, 21, confine the plasma and define the bore B (FIG. 4), e.g., of about 1.40 millimeters, and preferably within the range of 0.5 to 5 millimeters, in internal diameter in the described embodiment, through which the laser discharge takes place. Each ferrule 40 and the laser discharge are thus in thermal contact during operation of the laser. Ferrules 40 by reason of being made of a refractory material are able to withstand intense ion bombardment without melting and to efficiently transfer the heat to the respective cup members 20, 21.

Refractory materials are particularly suitable for high temperature applications and have superior dimensional stability and wear performance under extreme bombardment conditions. Heat transferred to the ferrule 40 by the laser discharge is thus transferred to the central portions 26, 26' of the respective cup members 20,21 and then through the respective rim portions 23, 23' and braze 24. The transferred heat then passes through the ceramic material comprising the wall thickness T. The thickness T is preferably in the range of 2.5 to 5 millimeters and in the illustrated example was about 4 millimeters. The outside diameter D of tube 10 is preferably in the range of 25 to 50 millimeters and in the illustrated example was about 28.5 millimeters. The heat emitted by the outer rim surfaces of the respective cup members 20,21 is finally transferred to the cooling medium such as water in the case of a water jacketed tube being used for illustration as the first embodiment.

The respective cup members 20, 21 are formed with gas return holes, designated 20a and 21a and which are purposely misaligned, e.g. by approximately 180°, from segment to segment as best illustrated in FIGS. 2, 3 and 4. Ionization of the gas in the return holes is prevented since the gas return path between the holes is preferably created as a zigzag or tortuous path and confined by a metallic channel formed by the cap members as shown. One segment 30 is joined to another segment 30 by means of a braze ring 50 which seals off the vacuum-water interface in the case of a water-jacketed type tube or the vacuum-air interface in the case of an air cooled type tube. The thickness of braze 50 is exaggerated for purposes of illustration in the drawings and in practice is a thin film.

Making reference to FIG. 7, the basic ceramic-metal subassembly, previously described is also suited to a fin air-cooled type construction such as illustrated in FIG. 7. In FIG. 7, an outer surface 60 is provided on each segment 15' to which the fins 61 are secured and are mounted within a suitable housing 62. The fins 61 mounted on one segment are aligned with the fins 61 on any mating interfaced segment. In use, cooling air is blown lengthwise of the fins and through housing 62 from a cooling air source, no shown.

In an alternative construction, not shown, the air fin structure can be added after the segments are bonded together to form a composite laser tube as in FIG. 1. In this form of cooling structure, a cooling fin structure can be added to all of the segments or to a series of segments spaced from another series of segments forming the tube.

The ferrules 40 are mounted end to end with a minimum air gap between each ferrule or may be coated with an electrically insulating layer and separated only by such thin layer on each end. The length of each ferrule 40 is thus substantially equal to the width S of each segment.

In summary, there has thus been provided an improved laser tube construction having at least these advantages:

(1) A minimum tendency to fracture either the metal or ceramic components.

(2) An efficiency substantially equal to that of a solid bore tube.

(3) Excellent dissipation of heat from the discharge to the surrounding cooling medium, whether water or air.

(4) Economical manufacturing cost and less than that of a solid bore tube.

(5) The ability to use the less expensive alumina as contrasted to the more expensive beryllia though adapted to both.

(6) Ease of inspecting brazed joints for quality.

(7) Ionization of gas in the gas return holes is prevented.

(8) Generally adapted to both water and air cooled type lasers.

(9) Ability to achieve a thin wall composite laser tube with gas return paths formed in cup members supporting the ferrules defining the bore of the tube.

(10) Easy to start and lase without requiring a magnetic field.

What is claimed is:

1. A gas laser tube, comprising:
   (a) a plurality of axially aligned, elongated, thin wall cylindrical segments of electrically insulating material successively disposed between electrodes at anode and cathode ends in hermetically bonded relationship with one another and forming an outer wall of the laser tube, each said cylindrical segment defining within the wall thereof a longitudinally extending cylindrical cavity;
   (b) a pair of thin metallic support members mounted within each said cavity of each said segment, each support member being formed with a gas path return hole offset from a gas path return hole of the other member of the pair and establishing a tortuous path therebetween, each support member having an outer peripheral rim portion located between the sides of said segment and bonded to the inner wall surface of said segment surrounding said cavity and integral and substantially concentric with said outer peripheral rim portion, an inner rim portion defining an axial aperture aligned with axial apertures of other support members;
   (c) a ferrule within each said cavity of each said segment located within and secured to the said inner rim portions of the said pair of support members within said cavity, said ferrule being substantially equal in length to the width of the segment in which the ferrule is secured and having an axial opening therethrough defining an axial bore for the laser discharge, said axial opening being substantially concentric with the said axial aperture of the said inner rim portions of said support members to which said ferrule is secured and aligned with the said axial opening of each other said ferrule; and
   (d) securing means bonding facing end surfaces of adjacent ones of said cylindrical segments in a manner effective to hermetically seal said discharge.

2. A gas laser tube as claimed in claim 1 wherein:
   (a) said segments are made of a material selected from the group consisting of alumina and beryllia;
   (b) said support members are made of copper; and
   (c) said ferrule is made of a material selected from the group consisting of tungsten, beryllia and silicon carbide.

3. A gas laser tube as claimed in claim 1 wherein said axial opening in said refractory metal ferrule is round and has a diameter within the range of 0.5 to 5 millimeters.

4. A gas laser tube as claimed in claim 1 wherein each said support member is made of copper.

5. A gas laser tube as claimed in claim 3 wherein the thickness of the wall of each said cylindrical segment is within the range of 2.5 to 5.0 millimeters and the outside diameter of each said cylindrical segment is within the range of 25 to 50 millimeters.

6. A gas laser tube as claimed in claim 4 wherein said copper is of about 0.5 millimeter thickness.

7. A gas laser tube comprising:
   (a) a plurality of axially aligned, elongated, thin wall cylindrical segments of electrically insulating material successively disposed between electrodes at anode and cathode ends in hermetically bonded relationship with one another and forming an outer wall the laser tube, each said cylindrical segment defining within the wall thereof a longitudinally extending cylindrical cavity;
   (b) a pair of thin metallic support members mounted within each said cavity of each said segment, each support member having an outer peripheral portion bonded to the inner wall surface of the segment in which it is mounted and an inner portion defining with the inner portion of the other support member of the pair an axial aperture aligned with axial apertures of other pairs of support members, each said support member having a gas path return hole axially offset from said axial aperture and also offset from one support member of the pair to the other in the direction of gas return travel, each pair of said support members providing a metallic channel forming gas communicating space and a torturous between the gas returning holes of the pair;
   (c) a ferrule within each said cavity of each said segment located within and secured to the said inner portions of the said pair of support members within said cavity, said ferrule being substantially equal in length to the width of the the segment in which the ferrule is secured and having an axial opening therethrough defining an axial bore for the laser discharge, said axial opening being substantially concentric with the said axial aperture of the said inner portions of said pair of support members to which said ferrule is secured and aligned with the said axial opening of each other said ferrule; and
   (d) securing means bonding facing end surfaces of adjacent ones of said cylindrical segments in a manner effective to hermetically seal said discharge.

* * * * *

UNITED STATES PATENT AND TRADEMARK OFFICE
CERTIFICATE OF CORRECTION

PATENT NO. : 4,774,713
DATED : September 27, 1988
INVENTOR(S) : Edwin G. Chaffee It is certified that error appears in the above-identified patent and that said Letters Patent is hereby corrected as shown below:

Column 1, line 67, correct "is" to --in--.
Column 1, line 68, correct "in" to --is--.

Column 4, line 48, correct "no" to --not--.

Column 6, line 43, insert "gas path" before --between--.

Column 6, line 43, correct "returning" to --return--.

Signed and Sealed this

Twenty-fifth Day of April, 1989

*Attest:*

DONALD J. QUIGG

*Attesting Officer*      *Commissioner of Patents and Trademarks*